W. L. PAUL.
PLOW.
APPLICATION FILED AUG. 20, 1912.
1,048,730.
Patented Dec. 31, 1912.
2 SHEETS—SHEET 2.
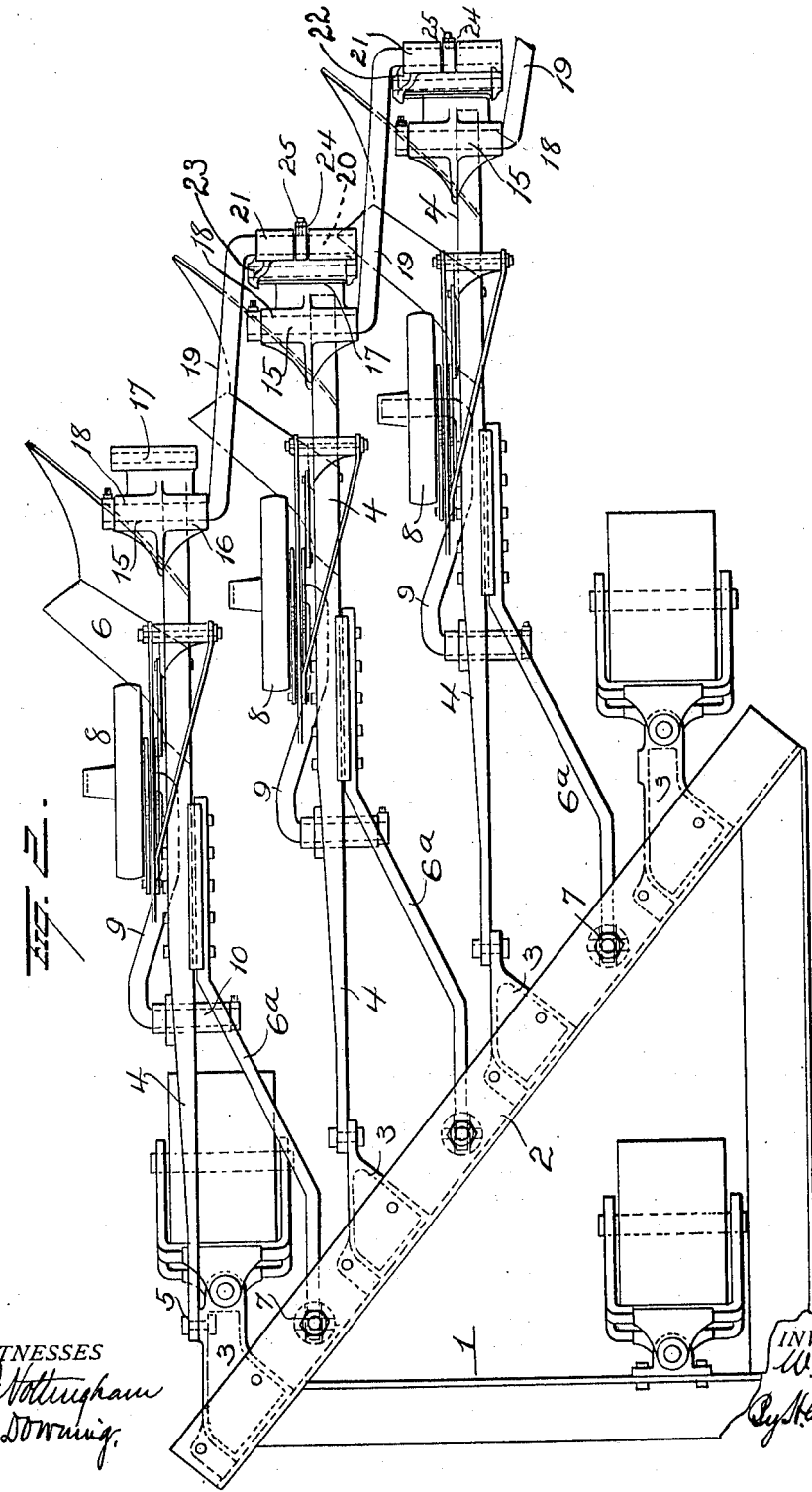

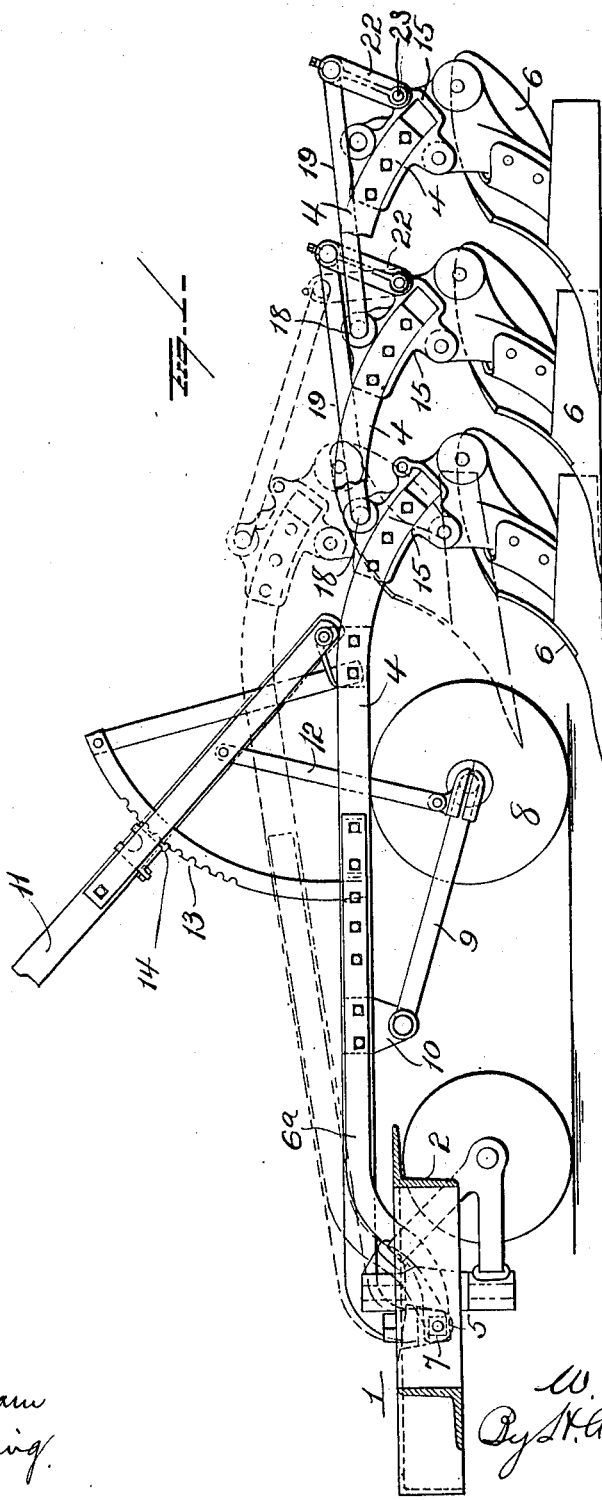

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

PLOW.

1,048,730.  Specification of Letters Patent.  Patented Dec. 31, 1912.

Application filed August 20, 1912. Serial No. 716,082.

*To all whom it may concern:*

Be it known that I, WILLIAM L. PAUL, a citizen of the United States, residing at South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to plows of the "engine gang" type,—one object of the invention being to construct an engine gang plow in such manner as to prevent lateral displacement, in both directions, of one plow member relatively to another and at the same time admit of free vertical play, so that each plow can be lifted independently of the others and so that each plow will accommodate itself to the unevenness of the ground without tending to strain or unduly influence or displace adjacent plows.

A further object is to so construct an engine gang plow in which the plow members are connected with each other, that torsional movements of the plow members will be compensated for and binding or undue friction and twisting will be reduced to a minimum.

With these and other objects in view, the invention consists in certain novel features of construction and combinations of parts as hereinafter set forth and pointed out in the claims.

In the accompanying drawings, Figure 1 is a side elevation of an engine gang plow embodying my improvements and Fig. 2 is a plan view of the same.

1 represents a triangular truck frame unit, the rear beam 2 of which is diagonally disposed as is the common practice with plow structures of the engine gang type, for attachment of the plow beams, and said truck frame may be supported on casters.

A plurality of brackets 3 (three such brackets being shown in Fig. 2 of the drawing) project rearwardly from the diagonal beam 2 of the truck frame, and to these brackets, the forward ends of plow beams 4 are pivotally connected by horizontal pivot pins 5 so that said beams can be independently lifted and have free vertical swinging movement and accommodate the soil engaging members 6 connected with the rear ends of said beams, to the unevenness of the ground or obstructions.

Each plow beam 4 is provided with a brace 6ª, the rear end of which is securely bolted to the plow beam intermediate of the ends of the latter and the forward end of each brace is pivotally connected as at 7, with the truck frame beam 2 at a point laterally removed from the pivotal connection of the plow beam with said truck frame. It will be observed that all of the pivotal connections of the several plow beams and their braces are in the same horizontal plane.

Suitable lifting means are provided for each of the several plow beams,—such, for example, as a lifting wheel 8 mounted at the rear end of a bail 9, the forward end of said bail being pivotally connected with a bracket 10 depending from an intermediate part of the plow beam. Each lifting wheel is manipulated by a hand lever 11 pivotally attached at one end to the rear portion of each plow beam, and each hand lever is connected, by means of a rod or link 12, with the adjacent lifting wheel bail 9. Suitable locking means are provided for each hand lever, and each of these may consist of a toothed segment 13 to be engaged by a detent 14 on the lever.

To the several plow beams, brackets 15 are rigidly secured for the attachment of devices which serve as means for flexibly connecting the several plows in a manner to permit free vertical movement, but effectually prevent lateral displacement in either direction without torsional strain. These devices will now be described in detail.

The brackets 15 may be conveniently secured to the rear ends of the plow engaging members as shown in the drawing or they may be secured to said beams farther forward. Each bracket 15 is made with two elongated sleeves 16 and 17 disposed with their axes parallel to the axes of the pivotal connections of the plow beams with the truck frame.

The sleeve 16 of each bracket 15 serves as an elongated bearing for an arm 18 at one end of an approximately Z-shaped rod or connecting device 19. The arm 20 at the other end of each connecting rod 19 has an elongated bearing in a divided sleeve 21 at one end of a link 22, the other end of the latter being pivotally connected with the sleeve 17 of the bracket 15 on the adjacent plow beam, such pivotal connection being effected by means of a suitable pivot pin 23. The arms 20 of the connecting rods 19 are adjustable lengthwise in the divided sleeve 21 to permit proper alining of the plows relatively to each other, and in order to secure said arms 20 at the proper adjustment, a collar 24 is mounted on each of said arms between the parts of the divided sleeve 21 and securely held on said arm by suitable fastening means, such as a set screw 25.

It will be observed that the several plows of the series are connected together by means of connecting rods which have elongated pivotal or hinge connection with said plow beams, said pivotal or hinge connections being all disposed on lines which are parallel with each other and also parallel with the lines in which the pivotal connections of the forward ends of the plow beams with the truck frame, are located. Such construction permits each plow to move freely in a vertical direction (as in lifting or passing obstructions) but provides connecting means for the several plows which will effectually prevent lateral movement of one plow relatively to another, and compensate for torsional strain among the plows of the gang. In other words, my improvements afford means by which torsional strain is met or resisted or carried from one plow to the others which collectively could cope with the same but which individually could not.

Having fully described my invention what I claim as new and desire to secure by Letters-Patent, is:—

1. In a gang plow structure, the combinations with a truck frame and a plurality of plows pivotally connected therewith, of cranked rods connecting said plows, one crank of each rod having direct pivotal connection with one of said plows and a pivoted link interposed between the other crank of each rod and another of said plows.

2. In an engine gang plow structure, the combination with a truck frame and a plurality of plows pivotally connected therewith, of two sleeves secured to each plow and disposed transversely of the beam thereof, connecting rods each having a crank arm at each end, one crank of each rod loosely mounted in one of the sleeves on one of said plows, and a link loosely mounted at one end on the other crank of the same connecting rod and pivotally connected at its other end with one of the sleeves on another of said plows.

3. In a gang plow, the combination with a truck frame and a plurality of plows pivotally connected at their forward ends with said truck frame, of connecting rods for the rear portions of the plows, each of said connecting rods having arms at both ends approximately at right angles to the line of draft, and permanent horizontal hinged connections between the arm at one end of each rod and said plows, and a pivoted link connecting the other arm of each rod with another of said plows.

4. In a gang plow, the combination with a truck frame and a plurality of plows pivotally connected at their forward ends with said truck frame, of elongated bearing devices fixed to each plow in rear of their forward pivoted ends, and connecting rods, each provided at respective ends with arms loosely mounted in said elongated fixed bearing devices on adjacent plows.

5. In a gang plow, the combination with a truck frame and a plurality of plows pivotally connected therewith, of a bracket on each plow in rear of the forward pivoted end thereof, connecting devices for the several plows, each connecting device having an arm at one end mounted in a bracket on one plow and having an arm at its other end, and a link pivotally connected with said last-mentioned arm and the bracket on another plow.

In testimony whereof, I have signed this specification in the presence of two subscribing witnesses.

WILLIAM L. PAUL.

Witnesses:
J. Fred. Kelley,
Geo. F. Downing.